(12) United States Patent
Hill

(10) Patent No.: US 8,163,176 B2
(45) Date of Patent: Apr. 24, 2012

(54) CONTINUOUS SLUDGE DECANT SYSTEM

(76) Inventor: Riles Edward Hill, Dahlonega, GA (US)

( * ) Notice: Subject to any disclaimer, the term of this patent is extended or adjusted under 35 U.S.C. 154(b) by 425 days.

(21) Appl. No.: 12/546,365

(22) Filed: Aug. 24, 2009

(65) Prior Publication Data

US 2011/0042328 A1 Feb. 24, 2011

(51) Int. Cl.
*B01D 21/02* (2006.01)
(52) U.S. Cl. .......... 210/187; 210/534
(58) Field of Classification Search .......... 210/187
See application file for complete search history.

(56) References Cited

U.S. PATENT DOCUMENTS

| | | | | |
|---|---|---|---|---|
| 533,424 A * | 2/1895 | Baldwin | 165/110 |
| 1,044,074 A * | 11/1912 | Nugent | 210/329 |
| 1,123,128 A * | 12/1914 | Kelly | 210/187 |
| 1,327,835 A * | 1/1920 | McKibben | 210/187 |
| 1,339,022 A * | 5/1920 | Clifford | 210/775 |
| 1,422,421 A * | 7/1922 | Cunningham | 423/659 |
| 1,448,593 A * | 3/1923 | Jaworski | 210/775 |
| 1,702,612 A * | 2/1929 | Morse | 210/187 |
| 1,806,698 A * | 5/1931 | Miller | 210/194 |
| 1,929,179 A * | 10/1933 | Piatt | 123/3 |
| 1,989,589 A * | 1/1935 | Fischer et al. | 210/603 |
| 2,059,231 A * | 11/1936 | Hamilton | 165/71 |
| 2,090,194 A * | 8/1937 | Fischer et al. | 210/259 |
| 2,129,266 A * | 9/1938 | Fischer et al. | 210/259 |
| 2,132,837 A * | 10/1938 | Talbot | 210/180 |
| 2,152,863 A * | 4/1939 | Bills | 210/180 |
| 2,188,847 A * | 1/1940 | Streander | 210/603 |
| 2,202,772 A * | 5/1940 | Durdin, Jr. | 210/603 |
| 2,231,269 A * | 2/1941 | Holmes | 210/296 |
| 2,262,576 A * | 11/1941 | Durdin, Jr. | 210/188 |
| 2,329,712 A * | 9/1943 | Gillican | 530/204 |
| 2,337,317 A * | 12/1943 | Eggert | 62/123 |
| 2,358,414 A * | 9/1944 | Peavey | 210/775 |
| 2,474,705 A * | 6/1949 | Vaughan et al. | 106/273.1 |
| 2,579,184 A * | 12/1951 | Glasgow et al. | 210/187 |
| 2,599,734 A * | 6/1952 | Winslow et al. | 210/130 |
| 2,625,915 A * | 1/1953 | Glasgow et al. | 122/33 |
| RE23,628 E * | 3/1953 | Glasgow et al. | 210/187 |
| 2,631,729 A * | 3/1953 | Osbon | 210/187 |
| 2,656,925 A * | 10/1953 | Johnson | 210/187 |
| 2,684,762 A * | 7/1954 | Silley et al. | 210/187 |
| 2,732,070 A * | 1/1956 | Glasgow et al. | 210/187 |
| 2,803,124 A * | 8/1957 | Howlett et al. | 68/18 D |
| 2,837,213 A * | 6/1958 | Murdock, Sr. | 210/187 |
| 2,843,270 A * | 7/1958 | Acosta | 210/525 |
| 2,978,344 A * | 4/1961 | Parker et al. | 106/1.19 |
| 3,107,601 A * | 10/1963 | Longmire | 99/330 |
| 3,272,339 A * | 9/1966 | Olson | 210/182 |
| 3,318,448 A * | 5/1967 | Fryer | 96/160 |
| 3,766,867 A * | 10/1973 | DeAngelis | 110/220 |
| 4,048,063 A * | 9/1977 | Cheng | 210/775 |
| 4,153,553 A * | 5/1979 | Davis | 210/95 |
| 4,170,551 A * | 10/1979 | Honour | 122/446 |

(Continued)

*Primary Examiner* — Robert James Popovics
(74) *Attorney, Agent, or Firm* — George R. Reardon

(57) ABSTRACT

A continuous sludge decant system and associated methods are disclosed. In one exemplary embodiment an apparatus for decanting sludge includes: a decant vessel configured to receive sludge influent, to contain the sludge to be heated and decanted, and to discharge the sludge and a decanted liquid from the sludge, and a heating/directional grid disposed within an interior of the decant vessel and around which the sludge is circulated, mixed, and stirred, the heating/directional grid comprising a plurality of heating coils and configured to circulate heat from a heat source through the decant vessel to decant the sludge. The vessel and the heating/directional grid are configured to contain, heat, mix, and decant the sludge without shearing the sludge.

1 Claim, 6 Drawing Sheets

U.S. PATENT DOCUMENTS

| | | | | |
|---|---|---|---|---|
| 4,238,332 A | * | 12/1980 | Samuel et al. | 210/774 |
| 4,385,990 A | * | 5/1983 | Cale | 210/187 |
| 4,579,563 A | * | 4/1986 | Burnside et al. | 44/282 |
| 4,758,246 A | * | 7/1988 | Burnside et al. | 44/311 |
| 4,778,115 A | * | 10/1988 | Burnside et al. | 241/46.06 |
| 4,876,015 A | * | 10/1989 | McKibben | 210/695 |
| 5,441,634 A | | 8/1995 | Edwards | |
| 5,762,763 A | * | 6/1998 | Tsargorodski | 203/11 |
| 6,531,058 B1 | | 3/2003 | Josse et al. | |
| 2011/0042328 A1 | * | 2/2011 | Hill | 210/800 |

\* cited by examiner

CONTINUOUS SLUDGE DECANT SYSTEM

FIELD OF THE INVENTION

The technology described herein relates generally to the field of sludge separation. More specifically, this technology relates to a continuous sludge decant system.

BACKGROUND OF THE INVENTION

Sludge is known to contain a high liquid content that adds significantly to the cost of freight when transferring sludge to a landfill. Additionally, the liquid contained in sludge is untreated and can contain contaminants. Sludge can be decanted to separate the liquids from the solids. Known methods of sludge decantation have many deficiencies, typically resulting in only a small amount of separation to occur. Additionally, known methods can result in shear of the sludge, which is an undesired, negative consequence.

Related patents known in the art include the following: U.S. Pat. No. 5,441,634, issued to Edwards on Aug. 15, 1995, discloses an apparatus and method of circulating a body of liquid containing a mixture of solid waste and water and separating them. U.S. Pat. No. 6,531,058, issued to Josse et al. on Mar. 11, 2003, discloses a biological liquidized bed apparatus.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a continuous sludge decant system and associated methods to separate liquids from solids.

In one exemplary embodiment, the technology described herein provides an apparatus for decanting sludge. The apparatus includes: a decant vessel configured to receive sludge influent, to contain the sludge to be heated and decanted, and to discharge the solids and a decanted liquid from the sludge, and a heating/directional grid disposed within an interior of the decant vessel and around which the sludge is circulated, mixed, and stirred, the heating/directional grid comprising a plurality of heating coils and configured to circulate heat from a heat source through the decant vessel to decant the sludge.

The vessel and the heating/directional grid are configured to contain, heat, mix, and decant the sludge without shearing the sludge.

The heating/directional grid is configured for liquid coupling to an external heat source.

The heating/directional grid is configured to direct movement, i.e., mix and stir, of the sludge without shearing the sludge.

The plurality of heating coils in the heating/directional grid are configured to heat the sludge evenly as the sludge rises to the top of the decant vessel.

The decant vessel is configured to be bottom-fed with the sludge influent, such that as the decant vessel is bottom-fed, the sludge passes around the plurality of heating coils of the heating/directional grid and is thereby mixed and heated without shear.

The decant vessel is configured to utilize the effect of gravity combined with the heating/directional grid to mix, heat, and circulate the sludge without shear.

In at least one embodiment, the apparatus for decanting sludge further includes a thermal control disposed on the decant vessel and configured to regulate a temperature of the sludge being processed within the decant vessel.

In at least one embodiment, the apparatus for decanting sludge further includes a temperature gauge disposed on the decant vessel and configured to display a temperature of the sludge being processed within the decant vessel.

In at least one embodiment, the apparatus for decanting sludge further includes at least one instrument controlled valve configured to control the decant of the sludge being processed within the decant vessel.

In various embodiments, the apparatus for decanting sludge further utilizes one or more of steam, wasted heat vapors, and wasted flash steam and/or electric elements to heat the plurality of heating coils in the heating/directional grid to heat the sludge without coming in direct contact with the sludge and without shear of the sludge.

In another exemplary embodiment, the technology described herein provides a continuous sludge decant system. The system includes: a decant vessel configured to receive sludge influent, to contain the sludge to be heated and decanted, and to discharge the solids and a decanted liquid from the sludge, a heating/directional grid disposed within an interior of the decant vessel and around which the sludge is circulated, mixed, and stirred, the heating/directional grid comprising a plurality of heating coils and configured to circulate heat from a heat source through the decant vessel to decant the sludge, a product feed, the product feed configured to introduce sludge into the decant vessel in a bottom-fed entry, a product discharge, the product discharge configured to disburse sludge and decanted liquid out of the decant vessel, and a pump, the pump configured to force the sludge back in a reverse direction through the heating/directional grid to force the sludge to reach its separating temperature.

In at least one embodiment the pump is a polymer injected pump.

In at least one embodiment the system further includes an auger configured to convey decanted solids, which become Secondary Product Nutrients (SPN), sludge.

In another exemplary embodiment, the technology described herein provides a method for decanting sludge. The method includes: utilizing a sludge decanting apparatus comprising: a decant vessel configured to receive sludge influent, to contain the sludge to be heated and decanted, and to discharge the solids and a decanted liquid from the sludge, and a heating/directional grid disposed within an interior of the decant vessel and around which the sludge is circulated, mixed, and stirred, the heating/directional grid comprising a plurality of heating coils and configured to circulate heat from a heat source through the decant vessel to decant the sludge, and containing, heating, mixing, and decanting the sludge in the sludge decanting apparatus without shearing the sludge.

The method can further include feeding the sludge into the decant vessel with a bottom-feed influent, and directing movement of the sludge within the decant vessel and around the heating/directional grid to facilitate mixing and separation of liquid from the sludge without shearing the sludge.

The method can further include utilizing the effect of gravity of the sludge in the decant vessel combined with the heating/directional grid to mix, heat, and circulate the sludge about the heating/directional grid.

The method can further include coupling the heating/directional grid to an external heat source, wherein the external heat source is one or more selected from the group consisting of: steam, wasted heat vapors, wasted flash steam, and electric coils, and heating the sludge within the decant vessel to a temperature at which the sludge reaches its sludge insulation factor, thereby facilitating thermal heat transfer from the heating/directional grid to the sludge, and thereby separating liquid from the solids.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
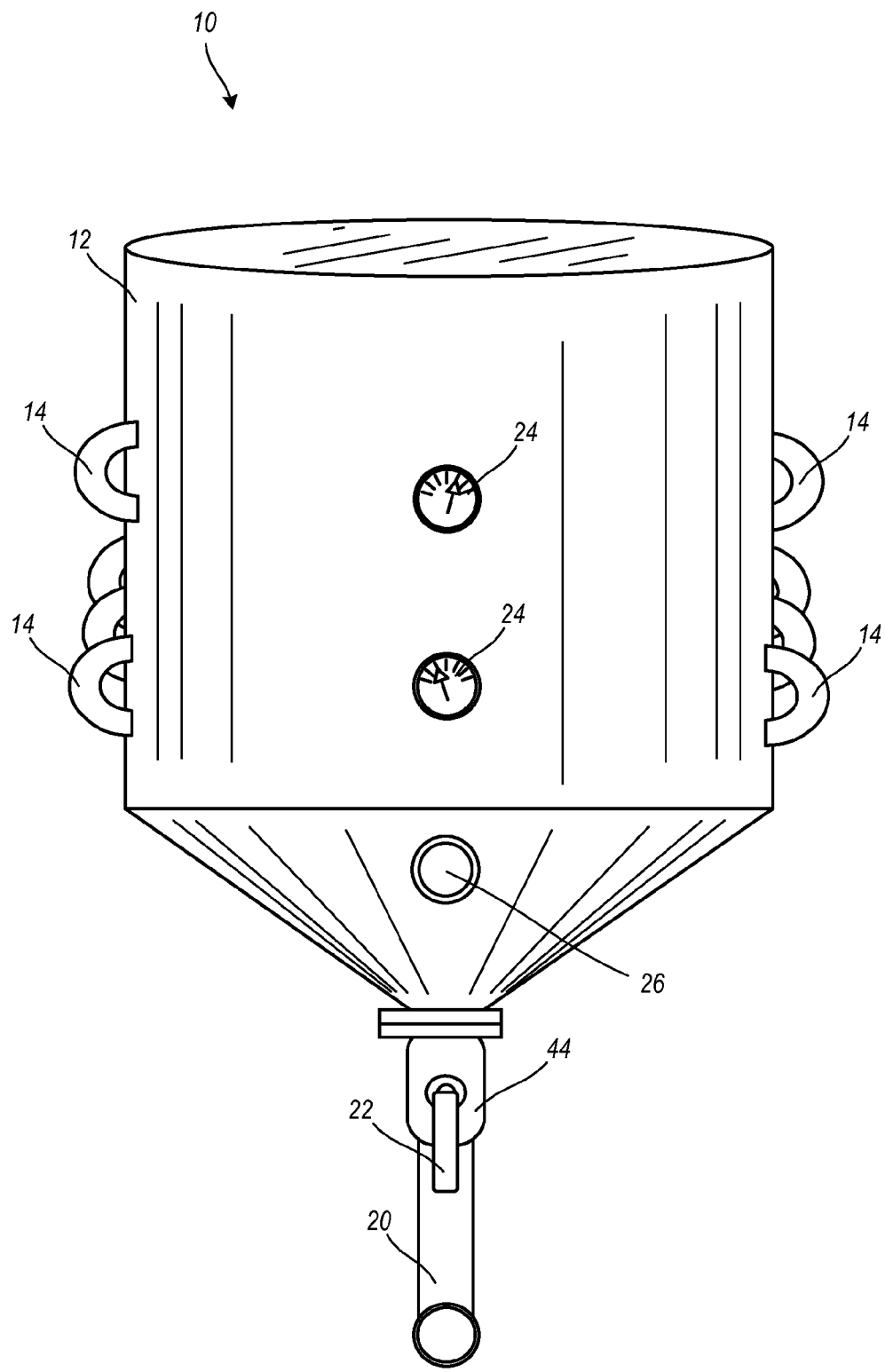
FIG. 1 is a front view of a continuous sludge decant system, illustrating, in particular, a bottom feed system for introducing product and a mixing grid to mix the product without shear, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a continuous sludge decant system and associated methods to separate liquids from solids.

The continuous sludge decant system is useful to reduce the liquid content within sludge. Sludge containing a high liquid content adds unnecessary weight and therefore incurs a high freight cost transporting the sludge to a landfill. Separation of the liquid content of the sludge concentrates the amount of sludge that needs transporting, and thus lessens the freight costs associated with transporting the sludge to be used as a value added end product. By way of example, concentrating the liquid content in sludge can result in an approximately 50% reduction in associated freight costs and enhancement of final product value. The continuous sludge decant system is useful to separate water from other components such as fat within the sludge introduced by means of thermal decant.

The continuous sludge decant system potentially is useful to reduce the overall tonnage of sludge that a landfill receives. As the sludge is decanted, the sludge weighs less and takes up less space, both of which attributes are beneficial to a landfill.

The liquids contained in sludge can contain various concentrates of contaminants such as ammonias, nitrates, nitrites, and the like. As the continuous sludge decant system is used to decant liquid from sludge before the sludge is transported to a landfill, or used in other applications, less concentrates of ammonias, nitrates, nitrites, and the like remain in the sludge. The liquids decanted can be treated by subsequent wastewater treatment, and the sludge transported to a landfill or further processes, therefore, contains fewer harmful contaminants.

The continuous sludge decant system is useful to reduce the liquid content within sludge such that the sludge can be readily acceptable for further processing. Useable product suitable for such processing is attained from the initial sludge prior to deportation to a landfill. There are financial benefits to reduce the amount of useable product that is sent to the landfill.

The continuous sludge decant system is useful to significantly reduce or to completely eliminate the processed sludge from going to a landfill, thus benefiting the environment.

Referring now to the Figures, a continuous sludge decant system 10 is shown. The continuous sludge decant system 10 includes a decant vessel 12 configured to receive the sludge 30 influent through product feed supply inlet 26 and to contain the sludge 30 while it is being heated, mixed, and decanted. The decanted solids 32 are removed from the decant vessel 12 during the draining stage. The decanted liquid 36 is drained from the decant vessel 12.

The continuous sludge decant system 10 includes a heating/directional grid 14 disposed within an interior of the decant vessel 12 and around which the sludge 30 is circulated, mixed, and stirred. The heating/directional grid 14 includes heating coils and is configured to circulate heat from a heat source through the decant vessel 12 to decant the sludge 30.

The heating coils of the heating/directional grid 14 loop in a continuous loop, back and forth through the decant vessel 12 and through which heat from a heat source circulates to heat the sludge 30. The turns in the heating coils are on the exterior of the decant vessel 12 and the straightaway portions of the heating coils are located in the interior of the decant vessel 12. The multiplicity of straightway portions of the heating coils form a heating/directional grid 14 within the decant vessel 12. Thus, the heating/directional grid 14 is configured to heat the sludge 30 as well as mix the sludge 30 as it passes around the heating/directional grid 14.

Utilization of the heating/directional grid 14 in this manner within the decant vessel 12 provides thermal transfer of heat from the external heat source to the sludge 30 to decant the sludge 30. Additionally, this process allows the sludge to be heated to a temperature such that the insulation factor of the sludge 30 is overcome and such that the sludge 30 does not shear during the decanting process. Utilization of the heating/directional grid 14 in this manner also benefits from the gravitational forces affecting the sludge 30 and the decant liquid 36. The sludge 30 is directed within the decant vessel 12 to mix and circulate around the heating/directional grid 14.

The decant vessel 12 can be formed in a generally upright cylindrical shape having a conical bottom. The decant vessel 12 can be manufactured of a durable material suitable for holding and managing sludge and decant liquids. The decant vessel 12 can include a plurality of supports legs (not shown) to provide structural support. The decant vessel 12 can include handles (not shown).

The decant vessel 12 is configured to receive sludge influent through product feed 26. The sludge product 30 is introduced through a bottom-feed system through product feed 26. After processing of the sludge is complete, and liquids have been decanted from the sludge product 30, the decant liquid 36 exits the decant vessel 12 through the decant pipe 20. The decant pipe 20 can be controlled, for example, by discharge valve 44 and lever 22. Other control mechanisms can be utilized.

The decant vessel 12 is configured with at least one coupling to provide connectivity to a thermal probe 24, such as a thermal control device, gauge, or the like. As shown, the decant vessel is configured with two thermal probes 24. A thermal control can be coupled to the thermal probe 24 and utilized to regulate a temperature of the sludge 30 being processed within the decant vessel 12. Similarly, a temperature gauge can be utilized at thermal probe 24 to display a temperature of the sludge 30 being processed within the decant vessel 12.

The decant vessel 12 is configured to utilize at least one instrument controlled valve 44 configured to control the decant of the sludge 30 being processed within the decant vessel 12. By way of example, an instrument controlled valve can regulate the influent/effluent speeds, the temperature of the heating/directional grid and its input heat source, and the like.

A heating/directional grid 14 is formed within the interior of the decant vessel 12 and around which the sludge 30 is circulated, mixed, and stirred. The heating/directional grid 14 includes heating coils that are configured to circulate heat from a heat source through the decant vessel 12 to decant the sludge 30. Connectivity of the heating/directional grid 14 to the heat source is achieved through liquid coupling at heating/directional grid terminals 40. External heat sources can include steam, wasted heat vapors, wasted flash steam, and the like, to heat the heating coils in the heating/directional grid 14 to heat the sludge 30 without coming in direct contact with the sludge 30 and without shear of the sludge 30.

Figure 2:
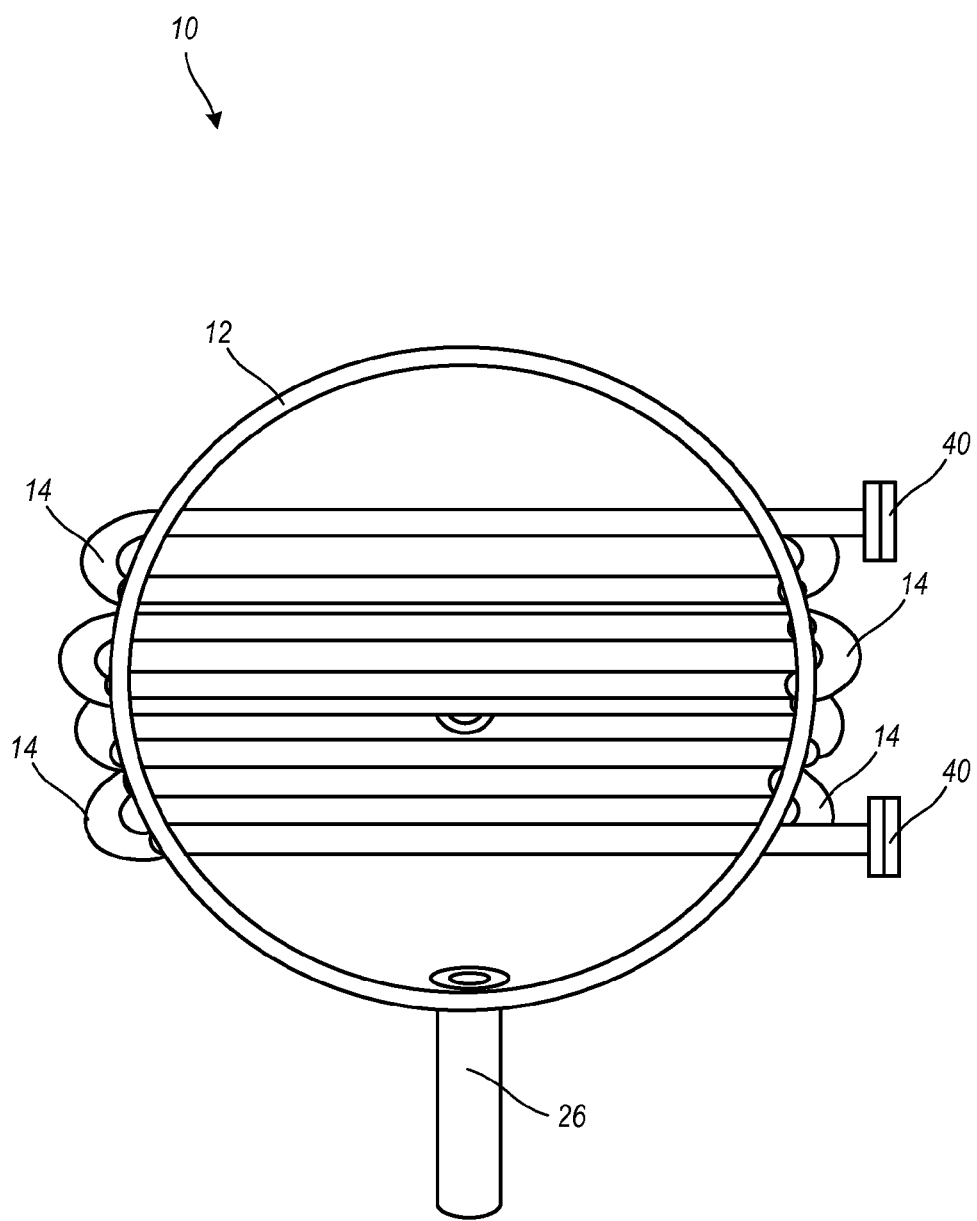
FIG. 2 is a top view of the continuous sludge decant system depicted in FIG. 1, illustrating, in particular, the heating/directional grid, as it appears on the inside of the decant vessel, according to an embodiment of the technology described herein.
Figure 3:
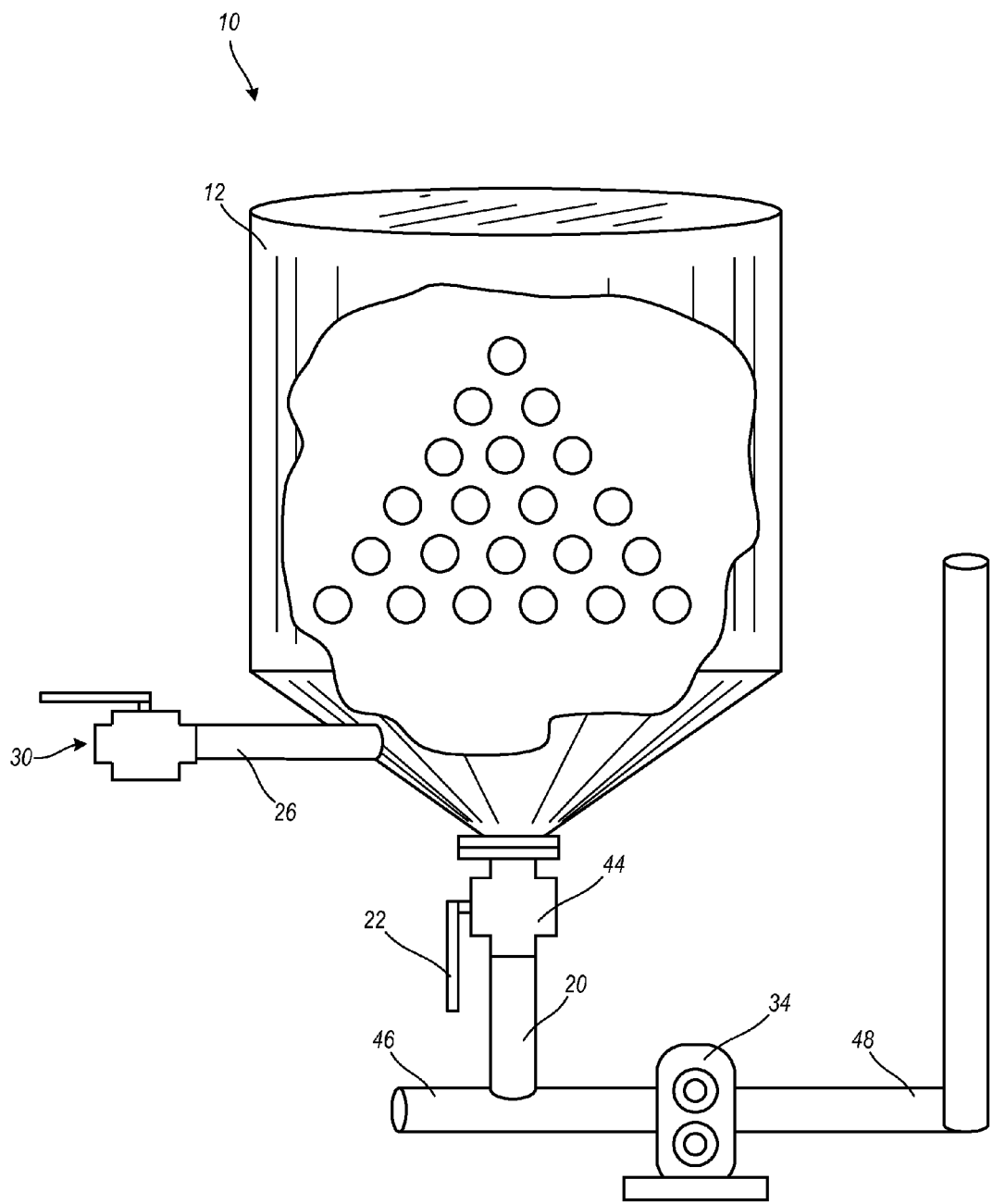
FIG. 3 is a schematic view of the continuous sludge decant system depicted in FIG. 1, illustrating, in particular, the heating/directional grid within the decant vessel, according to an embodiment of the technology described herein.
Figure 4:
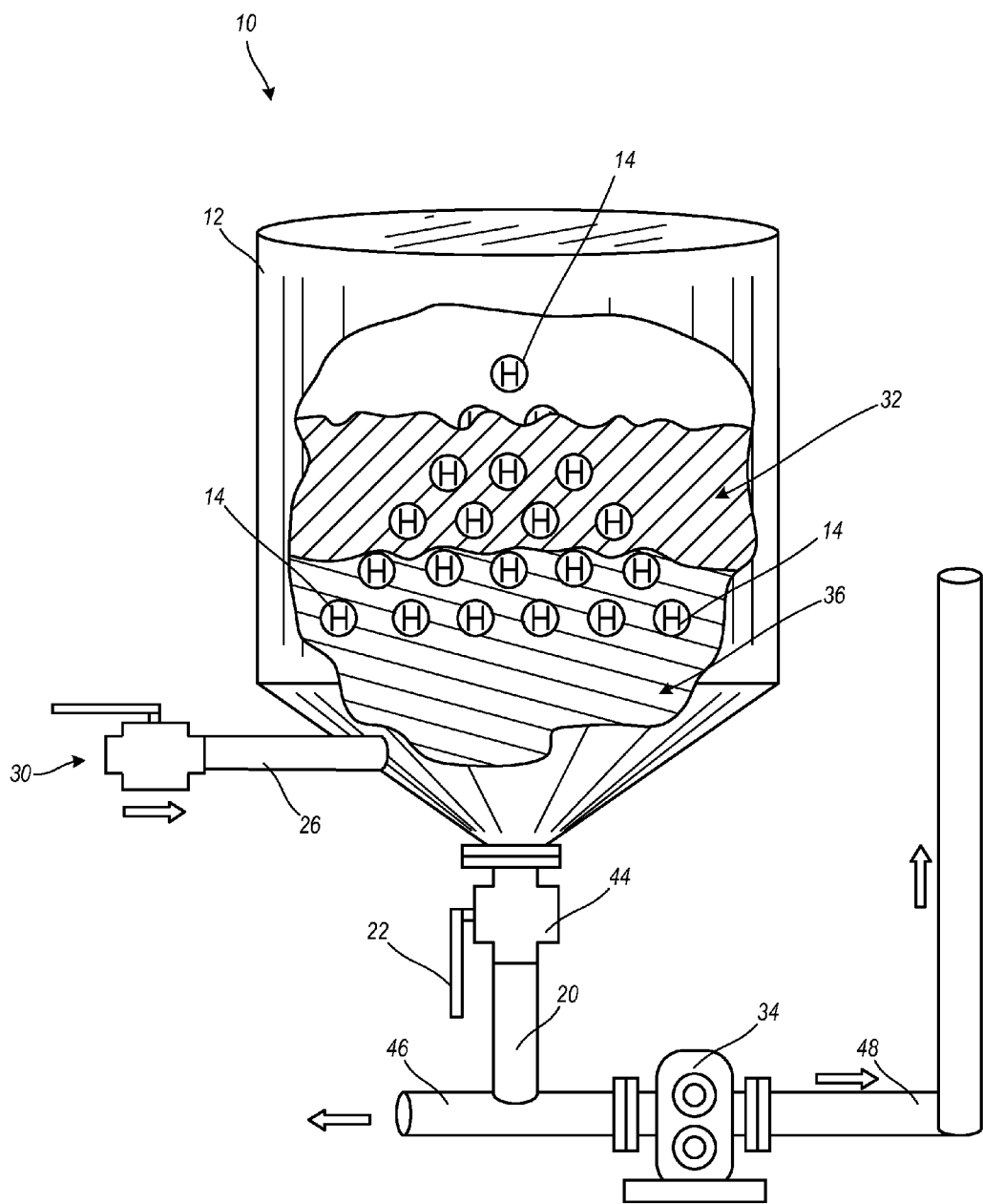
FIG. 4 is a schematic view of the continuous sludge decant system depicted in FIG. 1, illustrating, in particular, the decant stage, according to an embodiment of the technology described herein.
Figure 5:
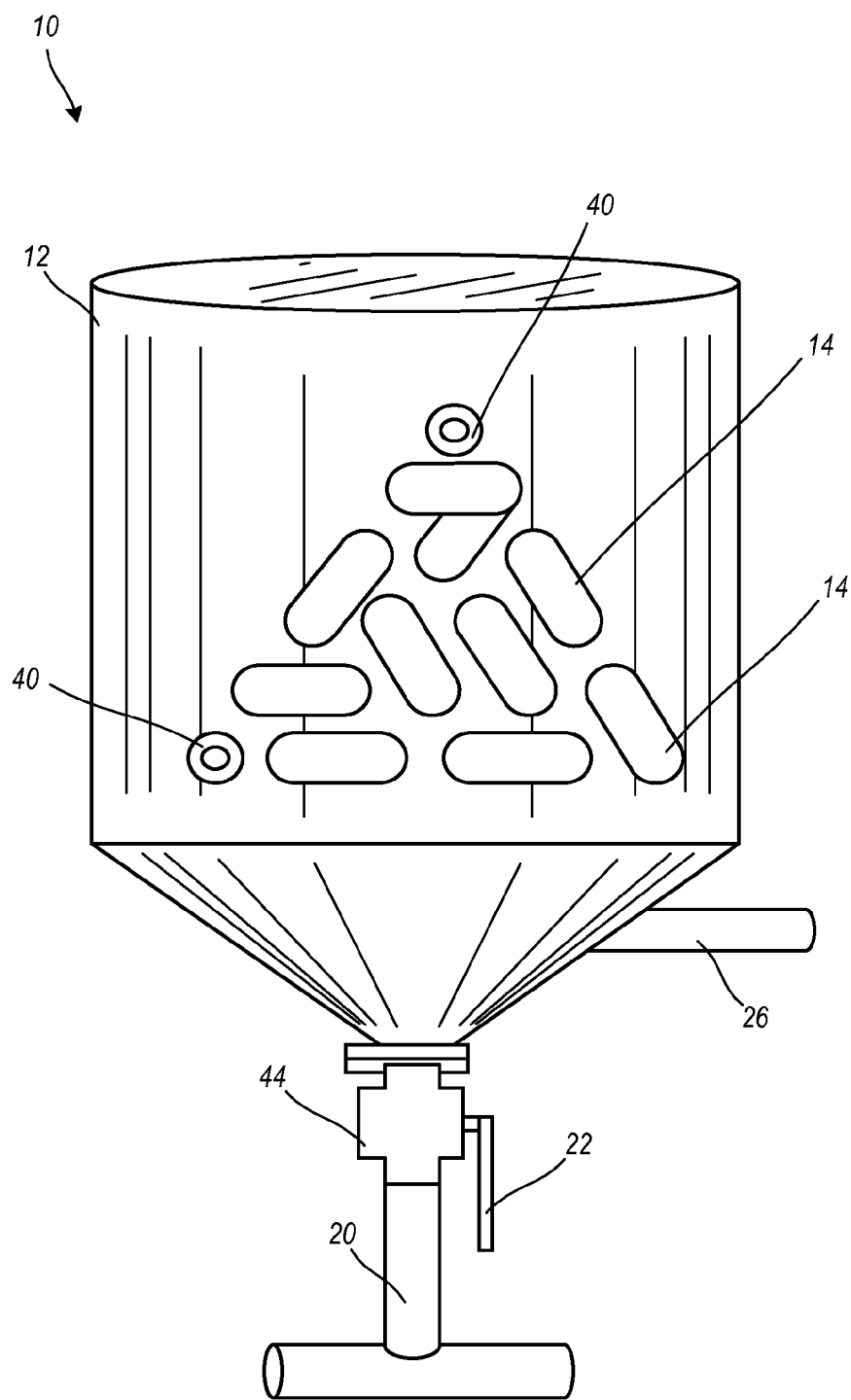
FIG. 5 is a side view of the continuous sludge decant system depicted in FIG. 1, illustrating, in particular, the vessel, heating/directional grid, and decant pipe, according to an embodiment of the technology described herein.
Figure 6:
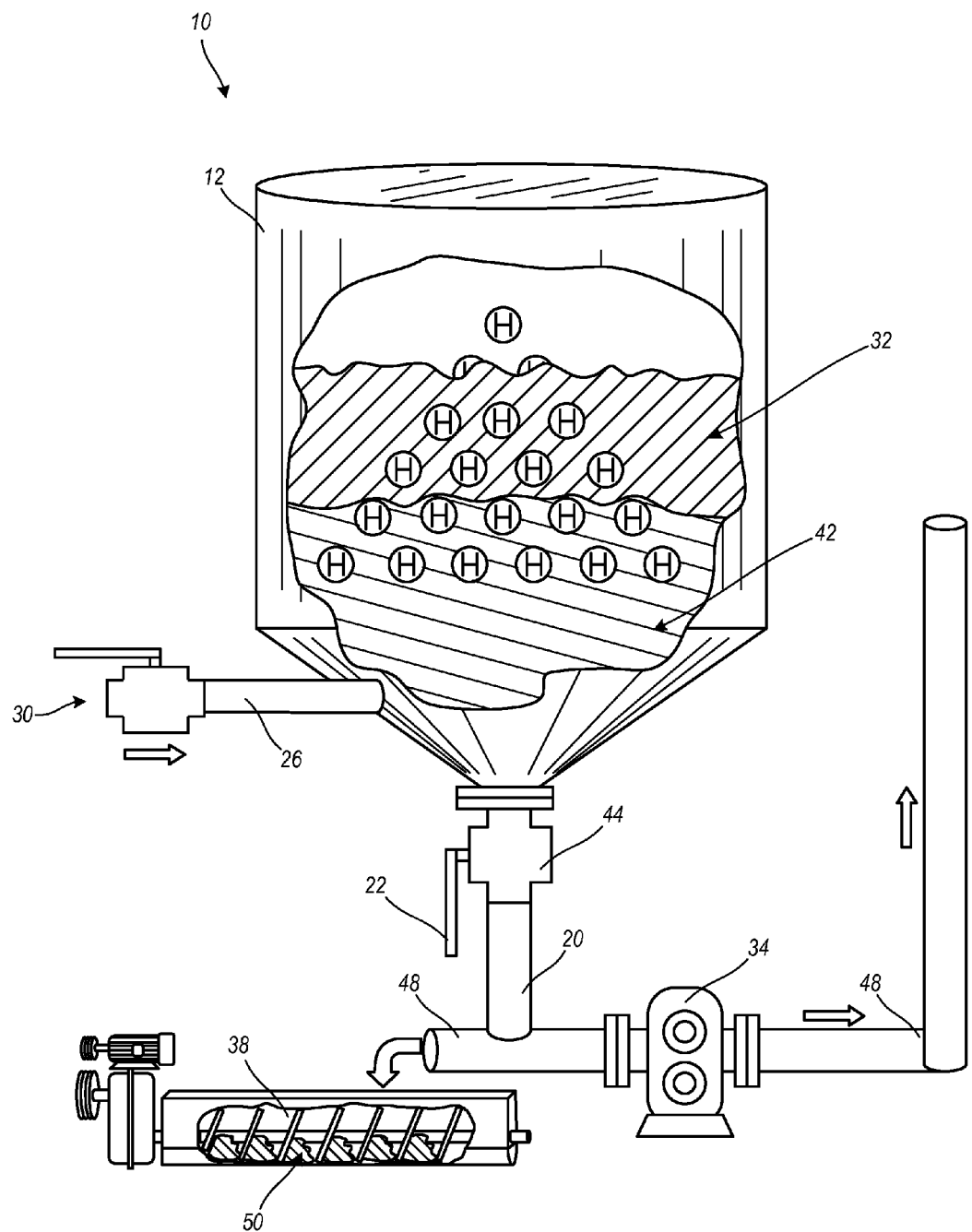
FIG. 6 is a schematic view of the continuous sludge decant system depicted in FIG. 1, illustrating, in particular, the decant stage with an auger system and augured decanted solids, according to an embodiment of the technology described herein.

As depicted specifically in FIG. 2, a top view of the decant vessel 12 and heating/directional grid 14 formed within, the pattern of the heating/directional grid 14 is shown. The turns in the heating coils are on the exterior of the decant vessel 12 and the straightaway portions of the heating coils are located in the interior of the decant vessel 12. The multiplicity of straightway portions of the heating coils form a heating/directional grid 14 within the decant vessel 12. This heating/directional grid 14 configuration utilizes the effect of gravity combined with the heating/directional grid 14 to mix, heat, and circulate the sludge 30 about the plurality of heating coils of the heating/directional grid 14.

The sludge product 30 is introduced through a bottom-feed system through product feed 26. The continuous sludge decant system 10 includes a pump 34 to facilitate the movement of the sludge as it enters the decant vessel 12 via product feed 26. In at least one embodiment, the pump 34 is a polymer injected pump. The pump 34 can be utilized in both directions depending on the application.

As the decant vessel 12 fills with sludge product 30, the heating/directional grid 14 mixes the sludge 30 as it is moved around and about the heating/directional grid 14. The heating/directional grid 14 is configured to direct movement of the sludge 30 as it rises to the top of the decant vessel 12 without shearing the sludge. The heating/directional grid 14 is configured to heat the sludge 30 evenly as the sludge rises to the top of the decant vessel 12. The vessel 12 and the heating/directional grid 14 are configured to contain, heat, mix, and decant the sludge 30 without shearing the sludge 30. It is advantageous not to shear the sludge. Effluent exits the decant vessel at decant discharge 20 and one or more of a decanted liquids discharge 46 and a decanted solids discharge 48.

The sludge is heated to a predetermined decant temperature to achieve maximum decant. Upon heating and mixing of the sludge 30 in the decant vessel 12 with the heating/directional grid 14, the separation process commences rapidly. The decanted product 32 surfaces to the top of the decant vessel 12. The decanting sludge is immediately stratified below the solid decanted sludge. Once the maximum decant temperature is attained, the decant liquid 36, is ready to be drained from the bottom of the decant vessel 12. The maximum decant temperature can vary based upon the various elements present in the sludge 30.

The solid decanted sludge 32 can be removed at the draining stage. Since the sludge is decanted at this point, it weighs less and contains less liquid with potential contaminants. Additionally, the decant vessel 12 can be refilled to allow for more time to decant. As decanted water 36 is drained from the decant vessel 12, the remaining sludge solids 32 are reheated by recycling through the heating/directional grid 14 in reverse order. This process can be repeated as necessary as a cycle. The continuous sludge decant system 10 can be utilized to control moisture for a pump application (tanker loads) or an auger application 38 (in house feed preparation) with decanted solids 42 to obtain augured decanted solids 50.

After the decanted liquid 36 is drained, new sludge product 30 can be introduced with existing product and recycled through the heating/directional grid 14. Once the decant vessel 12 is filled, the decant process is resumed. Existing product remaining in the decant vessel 12 can be passed back through the heating/directional grid 14 and reheated. Simultaneously, new product can be introduced through the heating/directional grid 14 and heated.

A method for decanting sludge 30, that utilizes a decant vessel 12 and heating/directional grid 14, as described above, is disclosed. The method includes: utilizing a sludge decanting apparatus 10 including: a decant vessel 12 configured to receive sludge influent 30, to contain the sludge 30 to be heated and decanted, and to discharge the sludge and a decanted liquid 36 from the sludge 30, and a heating/directional grid 14 disposed within an interior of the decant vessel and around which the sludge 30 is circulated, mixed, and stirred, the heating/directional grid 14 including heating coils and configured to circulate heat from a heat source through the decant vessel 12 to decant the sludge 30, and containing, heating, mixing, and decanting the sludge 30 in the decant vessel 12 without shearing the sludge 30.

The method can further include feeding the sludge 30 into the decant vessel 12 with a bottom-feed influent, and directing movement of the sludge 30 within the decant vessel 12 and around the heating/directional grid 14 to facilitate mixing and separation of liquid 36 from the sludge 30 without shearing the sludge.

The method can further include utilizing the effect of gravity of the sludge 30 in the decant vessel 12 combined with the heating/directional grid 14 to mix, heat, and circulate the sludge 30 about the plurality of heating coils of the heating/directional grid 14.

The method can further include coupling the heating/directional grid 14 to an external heat source. The external heat source can include one or more of steam, wasted heat vapors, wasted flash steam, and electric components. The method further includes heating the sludge 30 within the decant vessel 12 to a temperature at which the sludge 30 reaches its sludge insulation factor, thereby facilitating thermal heat transfer from the heating/directional grid 14 to the sludge 30, and thereby separating liquid 36 from the sludge 30.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. An apparatus for decanting sludge, the apparatus comprising:
   a decant vessel having an inlet for receiving sludge influent to be treated and an outlet at a lowermost location thereof to discharge solids and a decanted liquid from said vessel; and
   a heating/directional grid disposed within an interior of the decant vessel and around which the sludge is circulated, mixed, and stirred, said inlet being constructed and arranged to introduce sludge influent into the vessel at a point beneath said grid, the heating/directional grid comprising a plurality of straight heating tubes arranged in a triangular formation having an uppermost apex to circulate heat from a heat source through the decant vessel to decant the sludge, said straight heating tubes extending through the sidewalls of said vessel and being fluidically connected each other by U-shaped portions external of said vessel, said triangular formation causing the sludge to be evenly heated as the sludge rises to the top of the decant vessel without shearing the sludge.

* * * * *